US012315319B2

(12) United States Patent
Shenoi et al.

(10) Patent No.: US 12,315,319 B2
(45) Date of Patent: May 27, 2025

(54) TAILGATING DETECTION USING MULTIMODAL ENTRY DATA

(71) Applicant: HAKIMO INC.

(72) Inventors: Abhijeet Shenoi, San Francisco, CA (US); Sagar Kashinath Honnungar, Mountain View, CA (US)

(73) Assignee: HAKIMO INC., Menlo Park, CA (US)

( * ) Notice: Subject to any disclaimer, the term of this patent is extended or adjusted under 35 U.S.C. 154(b) by 75 days.

(21) Appl. No.: 18/318,226

(22) Filed: May 16, 2023

(65) Prior Publication Data

US 2024/0386766 A1 Nov. 21, 2024

(51) Int. Cl.
G07C 9/15 (2020.01)
G06T 7/70 (2017.01)
(Continued)

(52) U.S. Cl.
CPC .............. G07C 9/15 (2020.01); G06T 7/70 (2017.01); G06V 20/41 (2022.01); G06V 20/52 (2022.01); G06V 40/168 (2022.01); G06V 40/172 (2022.01); G07C 9/00571 (2013.01); G06T 2207/10016 (2013.01); G06T 2207/30201 (2013.01); G06T 2207/30232 (2013.01)

(58) Field of Classification Search
CPC ........ G07C 9/15; G07C 9/00571; G06T 7/70; G06T 2207/10016; G06T 2207/30201; G06T 2207/30232; G06V 20/41; G06V 20/52; G06V 40/168; G06V 40/172; H04N 7/18
USPC ........................................................ 340/5.7
See application file for complete search history.

(56) References Cited

U.S. PATENT DOCUMENTS 6,720,874 B2 * 4/2004 Fufido .................. G08B 13/183
340/556
7,382,895 B2 * 6/2008 Bramblet ................. G07C 9/15
382/103
(Continued)

FOREIGN PATENT DOCUMENTS

JP 2006120086 A 5/2006
JP 2010152552 A 7/2010

OTHER PUBLICATIONS

Intublog, intuVision VA—Tailgate Detection, © Copyright 2006-2023—https://www.intuvisiontech.com/solutions/person-tailgating.

Primary Examiner — Nam V Nguyen
(74) Attorney, Agent, or Firm — CHIP Law Group

(57) ABSTRACT

An electronic device and method for tailgating detection is provided. The electronic device receives data from an access control system for a physical entry point. When an event that indicates an access grant is detected, entry information for a period is collected. The information includes a set of authentications provided by the access control system. The electronic device receives a video from at least one imaging device, extracts object detection information from the video, and determines cost information based on a comparison of a time of each entry and a time of each authentication. Thereafter, the electronic device determines a correspondence between a subset of the entries and the authentications based on the cost information. The electronic device detects, from entries included in the object detection information, one or more entries that are different from the subset as tailgating entries. An output device renders tailgating information based on such entries.

18 Claims, 7 Drawing Sheets

(51) Int. Cl.
    *G06V 20/40*     (2022.01)
    *G06V 20/52*     (2022.01)
    *G06V 40/16*     (2022.01)
    *G07C 9/00*     (2020.01)

(56) References Cited

U.S. PATENT DOCUMENTS

| | | | | |
|---|---|---|---|---|
| 7,999,847 | B2 * | 8/2011 | Donovan | H04N 7/18 |
| | | | | 348/143 |
| 8,330,814 | B2 * | 12/2012 | Matsuda | G07C 9/00 |
| | | | | 348/148 |
| 9,142,106 | B2 * | 9/2015 | Jerhotova | G08B 13/00 |
| 10,235,854 | B2 * | 3/2019 | Trani | H04W 4/021 |
| 10,373,408 | B2 * | 8/2019 | Trani | G07C 9/28 |
| 10,957,137 | B2 * | 3/2021 | Baumgarte | G08B 7/06 |
| 11,200,767 | B2 * | 12/2021 | Boyes | G07C 9/37 |
| 11,315,374 | B2 * | 4/2022 | Arrufat Ribas | G07C 9/28 |
| 11,482,088 | B1 * | 10/2022 | Russo | G08B 15/00 |
| 11,798,340 | B1 * | 10/2023 | Xu | G07C 9/30 |
| 2007/0268145 | A1 * | 11/2007 | Bazakos | G07C 9/28 |
| | | | | 340/521 |
| 2008/0285802 | A1 | 11/2008 | Bramblet et al. | |
| 2023/0050055 | A1 * | 2/2023 | Houston | H04N 7/181 |

\* cited by examiner

TAILGATING DETECTION USING MULTIMODAL ENTRY DATA

FIELD

Various embodiments of the disclosure relate to physical access control systems. More specifically, various embodiments of the disclosure relate to an electronic device and method for tailgating detection using multimodal entry data.

BACKGROUND

Tailgating is a well-known security problem in which unauthorized people gain access to restricted areas by following authorized personnel through a door or gate. Tailgating is still a common problem in businesses, despite the implementation of various security measures. This is because it is difficult to change people's behavior to ensure that no one has access without proper authorization. Tailgating can be addressed with a variety of security measures, including security cameras, turnstiles, security guards, and access control electronic devices. These solutions, however, have limitations and cannot completely eliminate tailgating.

Further limitations and disadvantages of conventional and traditional approaches will become apparent to one of skill in the art, through comparison of described electronic devices with some aspects of the present disclosure, as set forth in the remainder of the present application and with reference to the drawings.

SUMMARY

An electronic device and method for tailgating detection using multimodal entry data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
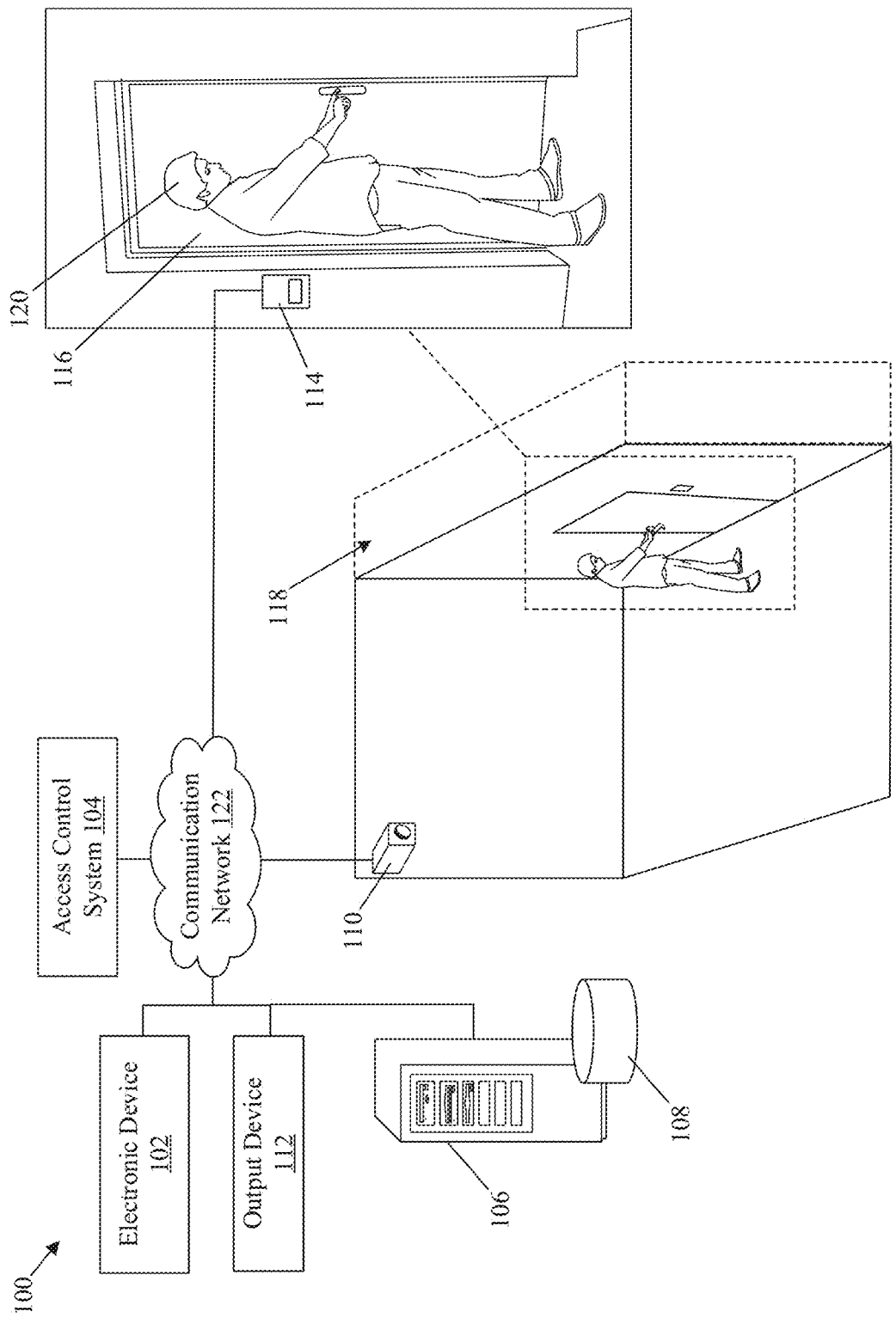
FIG. 1 is a block diagram that illustrates an exemplary network environment for tailgating detection, in accordance with an embodiment of the disclosure.

The following described implementations may be found in the disclosed electronic device and method for tailgating detection using multimodal entry data. Exemplary aspects of the disclosure may provide an electronic device (such as a server, a workstation, a mobile device, and so on) that may be configured to receive data from an access control system that is communicably coupled to a lock system (e.g., an electronic lock that supports a biometric or badge-based authentication) for a physical entry point (such as a door or a gate). The access control system may be a security system designed to regulate and manage entry into or exit from a particular space. Based on the received data, the electronic device may be configured to detect an event that indicates a grant to access a physical area (such as a room, an office space, a parking space, or a road with access limitations) via the physical entry point.

Within a defined period from a time of the detection of the event, the electronic device may be configured to receive entry information that includes a set of authentications provided by the lock system. Each authentication may be associated with an authentication type and may correspond to an object such as a person or a vehicle in which the person is a rider or a driver of the vehicle. Examples of the authentication type may include, but are not limited to, a radio frequency-based authentication, a fingerprint-based authentication, a face-based authentication, an iris-based authentication, a voice-based authentication, a hand gesture-based authentication, a touch-based authentication, a password-based authentication, or an identifier (ID) based authentication.

After the authentication, the electronic device may be configured to receive a video from at least one imaging device (such as a digital camera, a thermal imaging camera, an optical sensor, and the like). From a portion of the video, the electronic device may extract object detection information that includes a set of entries corresponding to the defined period. In order to match the set of entries with the set of authentications, the electronic device may be configured to determine cost information (for example, a cost matrix) based on a difference between a time of each entry of the set of entries and a time of each authentication of the set of authentications. Based on the cost information, the electronic device may be configured to determine a correspondence between a subset of the set of entries and the set of authentications. Thereafter, from the set of entries, the electronic device may detect one or more entries that may be different from the subset as one or more tailgating entries and may control an output device (such as a display device, a display of a mobile device, and the like) to render tailgating information based on the detected one or more tailgating entries.

Despite various security measures, tailgating remains a common problem for most establishments. The problem of tailgating is typically addressed using various measures, such as security cameras, turnstiles, security guards, and access control electronic devices. However, these solutions have limitations and cannot entirely prevent tailgating. Furthermore, analyzing the video footage takes time and requires human intervention. Turnstiles may be another security measure that may prevent tailgating by only allowing one person to pass through at a time. However, turnstiles are costly to install and maintain, and can cause delays and inconvenience. Furthermore, turnstiles may not perform well in high-traffic areas.

Security guards are frequently used to prevent tailgating by manually verifying the identity of each individual entering the secured area. However, the guards are not always dependable. It may not be possible in some locations to have security guards at all entry points, leaving some areas vulnerable to tailgating incidents. By requiring a valid access credential, such as a swipe card or PIN, access control electronic devices can be designed to prevent unauthorized access to secured areas. Such electronic devices, however, are unreliable because access control electronic devices are vulnerable to tailgating incidents when an authorized person holds the door open for others or when an unauthorized person follows closely behind an authorized person. As a result of tailgating, organizations may be vulnerable to problems such as sensitive data breach, asset loss, and personnel harm.

The present disclosure may address aforementioned issues by detecting tailgating entries without a need for any additional hardware, using only camera video(s) and authentication data from access control system(s). Use of a matching algorithm such as the Hungarian matching algorithm with the cost information may help to filter the camera-detected entries into two sets. The first set may include authorized camera-detected entries which match the authentications, and the second set may include all unmatched entries (i.e., unmatched with any of the authentications) that can be classified as tailgating entries. The present disclosure provides a cost-effective solution that enhances security of a physical area by detecting tailgating entries, identifying potential security risks associated with such entries, and notifying security personnel about such entries in near real time.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for tailgating detection, in accordance with an embodiment of the disclosure. With reference to FIG. 1, there is shown a network environment 100. The network environment 100 includes an electronic device 102, an access control system 104, a server 106, a database 108, a camera 110, an output device 112, and a communication network 122. The electronic device 102 may communicate with the access control system 104, the server 106, the camera 110, and the output device 112, via the communication network 122. The access control system 104 may be communicably coupled to the lock system 114 for a physical entry point 116 (such as a door) to access a physical area 118. The physical area 118 may be a part of a built environment or an open environment with one or more controlled access zones.

Figure 3:
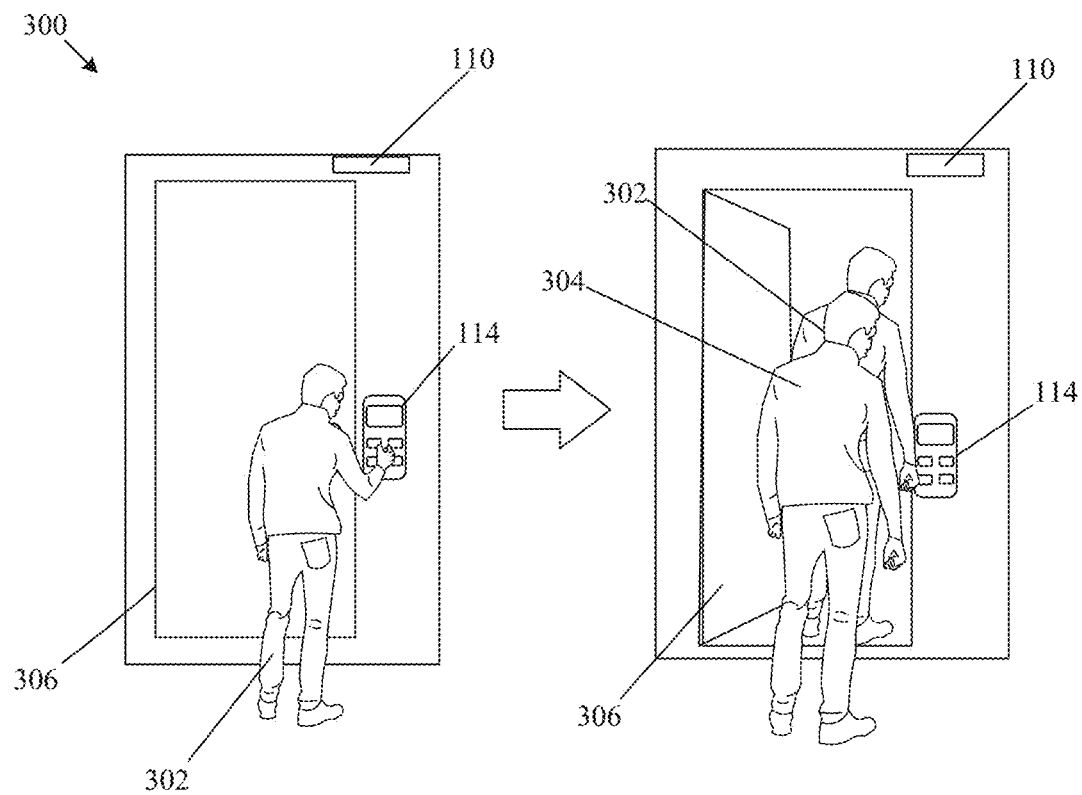
FIG. 3 is a diagram that illustrates an exemplary tailgating scenario with one or more persons, in accordance with an embodiment of the disclosure.
Figure 4:
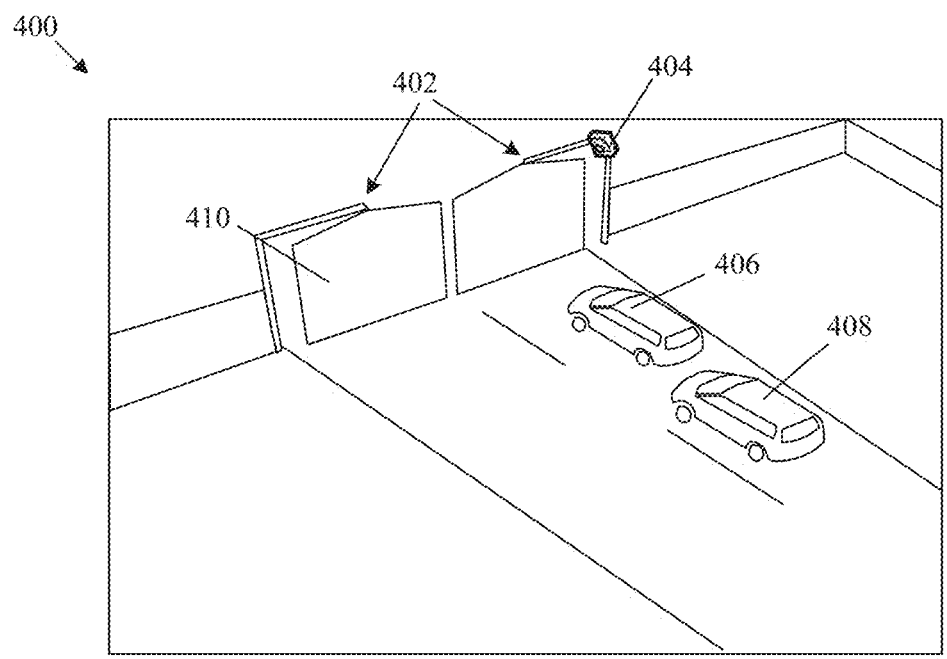
FIG. 4 is a diagram that illustrates an exemplary scenario in which an unauthorized vehicle tailgates an authorized vehicle through an entry point, in accordance with an embodiment of the disclosure.

The network environment 100 may further include a set of objects, for example, a person 120. In an embodiment, each of the set of objects may correspond to a vehicle in which a person may be a rider or a driver of the vehicle (as shown in FIG. 4). In another embodiment, each of the set of objects may correspond to a person (as shown in FIG. 3).

The electronic device 102 may include suitable logic, circuitry, interfaces, and/or code that may be configured to detect tailgating entries based on information received from multimodal sources, such as the camera 110 and the access control system 104. The detection of a tailgating entry may correspond to an event in which an unauthorized object (e.g., a person or a vehicle) may gain unauthorized access to the physical area 118 by following an authorized object (i.e., another person or vehicle) through an entry point (or an exit point) with a controlled access. Examples of the electronic device 102 may include, but are not limited to, a computing device such as a personal computer, a laptop, or a computer workstation, a server, or an edge device connected to an organization's network. In accordance with an embodiment, the electronic device 102 may be a component of the access control system 104 or may be integrated into the camera 110.

The access control system 104 may be a physical access control system that may be required to control access to a particular physical area, such as a building, a restricted space within the building, a section of a road, or a parking space for individuals or vehicles. The access control system 104 may store data on authorized objects and may use such data to validate attempts (and verify credentials of the objects) to access the physical entry point 116 (e.g., a door). Example of the credentials associated with the access control system 104 may include, but is not limited to, fobs and key cards, encrypted badges, mobile credentials, PIN codes, and passwords.

The access control system 104 may authorize or restrict access to the physical area 118 based on predefined policies and the validation. Examples of the access control system 104 may include, but are not limited to, a keypad-based system that requires a user to enter a secret code via a keypad to gain entry to the physical area 118, a card access control system that uses a card reader to verify the identity of users, a biometric system that uses biometric information such as fingerprints, facial recognition, or iris scans to verify the identity of users, a system that uses a mobile device such as a smartphone with a specific authenticator app installed, a system that uses Near-Field Communication (NFC) signals, Bluetooth beacons, or other wireless technologies to authenticate an object, an intercom system that requires the object to communicate with a security personnel via the intercom system for identity verification, a proximity access control system that uses a proximity card or a key fob, and a turnstile system that uses a mechanical turnstile or gate.

The server 106 may include suitable logic, circuitry, interfaces, and/or code that may be configured to store data received from the access control system 104 or the electronic device 102, video feeds from at least one imaging device (such as the camera 110), and entry information that includes a set of authentications provided by the access control system 104. The server 106 may provide information associated with a blacklisted object, a whitelisted entry profile, and one or more unsafe items in the physical area 118. The information may be provided in response to requests received from the electronic device 102.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without a departure from the scope of the disclosure.

The database 108 may include suitable logic, interfaces, and/or code that may be configured to store the information associated with the physical entry point 116, the physical area 118, the person 120, a list of blacklisted objects, the whitelisted entry profile, and the one or more unsafe items. The database 108 may be a relational database, a non-relational database, or a set of files stored in conventional or big-data storage. In an embodiment, the database 108 may be stored or cached on a device, such as the server 106. The device storing the database 108 may be configured to receive a query for the information from the electronic device 102. In response, the server 106 of the database 108 may be configured to retrieve and provide the queried information to the electronic device 102. Operations of the database 108 may be executed using hardware including a processor, a microprocessor (e.g., to perform or control performance of one or more operations), a field-programmable gate array (FPGA), or an application-specific integrated circuit (ASIC).

The imaging device (such as the camera 110) may include suitable logic, circuitry, and interfaces that may be configured to capture a video of the physical entry point 116 and the set of objects in the vicinity of the physical entry point 116. Examples of the imaging device (such as the camera 110) may include, but are not limited to, an image sensor, a wide-angle camera, an action camera, a closed-circuit television (CCTV) camera, a camcorder, a camera with an integrated depth sensor, a cinematic camera, Digital Single-Lens Reflex (DSLR) camera, a Digital Single-Lens Mirrorless (DSLM) camera, a digital camera, a camera phone, a time-of-flight camera (ToF camera), a night-vision camera, and/or other image capture devices.

In FIG. 1, only one imaging device (such as the camera 110) is shown to have the physical entry point 116 in a field of view of the imaging device. However, the disclosure may not be limited to presence of one imaging device in the built environment. In some embodiments, a plurality of imaging devices may be installed to cover the physical entry point 116 from different viewpoints, without a departure from the scope of the disclosure.

The output device 112 may include suitable logic, circuitry, and interfaces that may be configured to display tailgating information. In at least one embodiment, the output device 112 may be a display screen which enables a user to provide a user input via the output device 112. The output device 112 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the output device 112 may refer to a display screen of a head mounted device (HMD), a smart-glass device, a see-through display, a projection-based display, an electro-chromic display, or a transparent display.

The lock system 114 may include one or more locking devices to manage access to the physical entry point 116. Each locking device may use electric current to operate an actuation mechanism that may actuate a locking mechanism by use of magnets, solenoids, or motors. The lock system 114 may operate the one or more locking devices based on control signals from the access control system 104. Such signals may be received by the lock system 114 in response to a successful authentication of an object (such as a person or a vehicle). The authentication may be based on information, such as a password or a pin that a person (such as the person 120) may be required to enter to unlock a door, a fingerprint, facial information, voice information, or identity information in a digital badge.

The physical entry point 116 may correspond to a physical barrier that may allow a two-way access or a one-way access to the physical area 118. Examples of the physical entry point 116 may include, but are not limited to, a door, a gate, or a turnstile.

The communication network 122 may include a communication medium through which the electronic device 102, the access control system 104, the server 106, the camera 110, and the output device 112 may communicate with each other. The communication network 122 may include one of a wired connection or a wireless connection. Examples of the communication network 122 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN).

Various devices in the network environment 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive data from the access control system 104. The data may include information associated with one or more authentication attempts to gain access to the physical area 118 via the physical entry point 116. Such attempts may include, for example, badge swipes, fingerprint scans, iris scans, pin or password entries, and the like. The data may also include details of object(s) (such as a person or a vehicle) that may have received access to the physical area 118 via the physical entry point 116. Additionally, or alternatively, the data may include an event log that may list down operations performed by the lock system 114 or the access control system 104 at different time stamps.

Based on the received data, the electronic device 102 may detect an event that indicates a grant to access the physical area 118 (such as an office space) via the physical entry point 116. Additionally, or alternatively, the event may indicate that the physical entry point 116 opened for the person 120 to exit the physical area 118.

Within a defined period from the time of the detection of the event, the electronic device 102 may receive entry information from the access control system 104. The defined period may correspond to a duration for which the physical entry point 116 stays open from the time of the detection of the event. The entry information may include, for example, a set of authentications provided by the access control system 104. For each authentication, the entry information may further include a unique identifier and a timestamp for the corresponding authentication. In accordance with an embodiment, each authentication of the set of authentications may correspond to at least one of a radio frequency-based authentication, a fingerprint-based authentication, a face-based authentication, an iris-based authentication, a voice-based authentication, a hand gesture-based authentication, a touch-based authentication, a password-based authentication, or an identifier (ID) based authentication.

At any time after the detection of the event, the electronic device 102 may receive a video (or a sequence of frames) from at least one imaging device (such as the camera 110). The camera 110 may be positioned to monitor the physical entry point 116 (such as a door) for movements. From a portion of the video, the electronic device 102 may extract object detection information that may include a set of entries corresponding to the defined period. Within the defined period, an entry may correspond to a movement of the object (i.e., a person or a vehicle) from an outside space to the physical area 118 via the physical entry point 116. During the movement, a person may exit from the physical area 118 to the outside space via the physical entry point 116. The exit may not be considered for tailgating detection and the person may be excluded from the set of entries. In some cases, the exit may require an authentication. Specifically, a badge reader may be installed on both sides of the door and the person may need to authenticate to exit the door. In such cases, tailgating may be detected separately for the entries and the exits from the door.

In order to detect tailgating entries, a match may have to be determined between the set of entries detected in the video (from the object detection information) and the set of authentications (from the entry information received from the access control system 104), as described herein. To obtain a match, the electronic device 102 may determine cost information based on a difference between a time of each entry of the set of entries and the time of each authentication of the set of authentications. Information associated with the time of each entry may be included in the object detection information or may be inferred to logs stored in the camera 110 or the database 108. Similarly, information associated with the time of each authentication may be included in the entry information.

The cost information may be used to determine a correspondence between a subset of the set of entries and the set of authentications. For example, the electronic device 102 may match the entries in the video with the authentications provided by the access control system 104. In case a tailgating event occurs within the defined period, the number of entries in the set of entries may exceed the number of authentications in the set of authentication. Thus, after the correspondence is determined, the set of entries may include one or more entries without a correspondence. The match may indicate a minimum cost association between each authentication of the set of authentications and a corresponding entry of the subset of entries.

From the set of entries, one or more entries may be identified as tailgating entries based on whether such entries are different from and not included in the subset of entries. Based on the detection of such tailgating entries, the electronic device 102 may control the output device 112 to render tailgating information. In at least one embodiment, the tailgating information may include a score to indicate an alarm probability for each tailgating entry. The output device 112 may include a display screen and/or an alarm system to alert security staff about presence of tailgating objects (e.g., a tailgating person or a tailgating vehicle).

Figure 2:
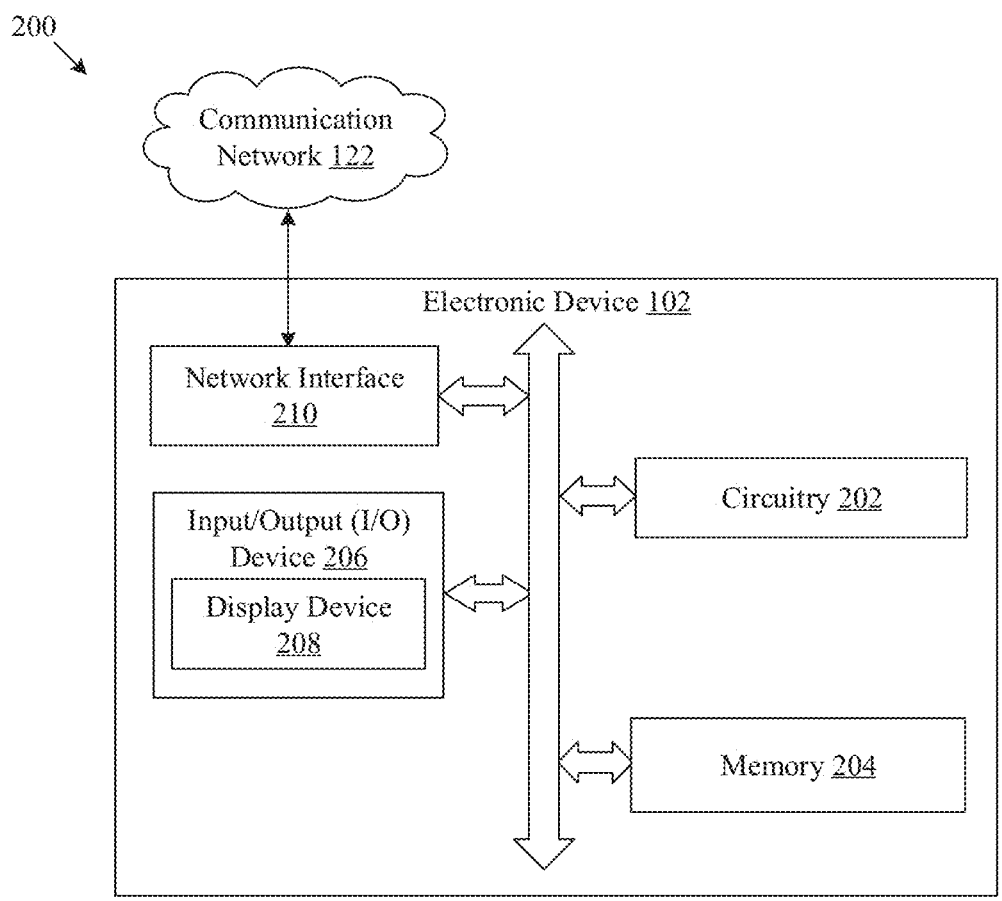
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102.

The electronic device 102 may include circuitry 202, a memory 204, an input/output (I/O) device 206, a display device 208, and a network interface 210. In at least one embodiment, the I/O device 206 may also include a display device 208. The circuitry 202 may be communicatively coupled to the memory 204, the I/O device 206, and the network interface 210 through wired or wireless communication of the electronic device 102.

A person of ordinary skill in the art will understand that the block diagram 200 of the electronic device 102 may also include other suitable components or electronic devices, in addition to the components or electronic devices which are illustrated herein to describe and explain the function and operation of the present disclosure. Detailed description of such components or electronic devices has been omitted from the disclosure for the sake of brevity.

The circuitry 202 may include suitable logic, code, and/or interfaces that may be configured to execute program instructions associated with different operations to be executed by the electronic device 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the program instructions executable by the circuitry 202. In at least one embodiment, the memory 204 may be configured to store the information associated with blacklist objects, whitelisted entry profiles, and unsafe items. Example implementations of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include one or more input and output devices that may communicate with different components of the electronic device 102. For example, the I/O device 206 may receive user inputs to trigger execution of program instructions associated with different operations to be executed by the output device 112. Examples of the I/O device 206 may include, but are not limited to, a touch screen, a keyboard, a mouse, a joystick, a microphone, the display device 208, and a speaker.

The network interface 210 may include suitable logic, circuitry, and interfaces that may be configured to facilitate communication between the electronic device 102, the access control system 104, the server 106, the camera 110, and the output device 112 via the communication network 122. The network interface 210 may be implemented by use of various known technologies to support wired or wireless communication of the server 106 with the communication network 122. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global Electronic device for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The I/O device 206 may include the display device 208. The display device 208 may include suitable logic, circuitry, and interfaces that may be configured to receive inputs from the circuitry 202 to render, on a display screen, tailgating information based on the detected entry. The display device 208 may include suitable logic, circuitry, and interfaces that may be configured to receive, via the UI, receive an input comprising a threshold time difference and determine the cost information further based on a comparison of the difference with the threshold time difference. In an embodiment, the threshold time difference may be prestored on the electronic device 102. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices.

FIG. 3 is a diagram that illustrates an exemplary tailgating scenario with one or more persons, in accordance with an embodiment of the disclosure. FIG. 3 is explained in conjunction with elements from FIG. 1 and FIG. 2. With reference to FIG. 3, there is shown an exemplary scenario 300. The exemplary scenario 300 may include a first person 302, a second person 304, and a physical entry point 306.

At $T_1$, the circuitry 202 may receive data from the access control system 104 associated with the physical entry point 306. For example, the physical entry point 306 may be a door to a restricted area of an office space or a server room with multiple physical entry/exit points. Each entry point may be secured using the lock system 114. The lock system 114 may be actuated by the access control system 104 to lock or unlock the door based on a status (e.g., a success or a failure) of authentication.

The access control system 104 may be configured to authenticate and provide users with grants to enter or exit access-controlled physical areas, that may otherwise be inaccessible without authentication. When an employee (such as the first person 302) swipes the access card or enters a PIN via an interface included in the lock system 114, the access control system 104 may verify credentials or secret information (e.g., a code associated with the access card or the PIN) against stored information associated with a list of authorized objects. After a successful verification, the access control system 104 may issue an access grant to the employee (which allows employee or enter or leave through the door) and may log the successful authentication in an event log or the database 108. The access control system 104 may also communicate with the lock system 114 to unlock the physical entry point 306, such as the door. The lock system 114 may further send a signal to the access control system 104 to confirm that the physical entry point 306 is unlocked for a defined period (e.g., 6 seconds). In at least one embodiment, the defined period may correspond to a duration for which the physical entry point 306 stays open from the time of the detection of the event.

Based on the data, the circuitry 202 may detect an event that indicates a grant to access the physical area 118 via the physical entry point 306 116. Within a defined period from a time of the detection of the event, the circuitry 202 may also receive entry information that includes a set of authentications provided by the access control system 104. After the event is detected, the circuitry 202 may receive from one or more imaging devices (such as the camera 110), one or more videos of the physical entry point 306 and other surrounding locations.

At $T_2$, the circuitry 202 may detect, from a portion of the video, object detection information that includes a set of entries corresponding to the defined period. In accordance with an embodiment, an object detection model may be applied on frames of the video to generate the object detection information. The information may include class labels for objects (such as persons 302 and 304) in the frames, bounding box coordinates to localize such objects in the frames, confidence scores for the class labels. In at least one embodiment, the object detection information may also include one or more timestamps associated with each entry of the set of entries in the video.

In at least one embodiment, the object detection model may be a neural network that may be pre-trained for an object detection task. The neural network may be referred to as a computational network of artificial neurons that includes a plurality of layers. The layers of the neural network may include an input layer, one or more hidden layers, and an output layer. Each layer of the plurality of layers may include one or more nodes (i.e., artificial neurons). Outputs of all nodes in the input layer may be coupled to at least one node of a hidden layer. Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyperparameters of the neural network. Such hyper-parameters may be set before or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

In training of the neural network, one or more parameters of each node of the neural network may be updated based on whether an output of the final layer for a given input (from the training dataset) matches a correct result based on a loss function for the neural network. The above process may be repeated for the same or a different input until a minima of a loss function is achieved, and a training error is minimized. Several methods for training are known in art, for example, gradient descent, stochastic gradient descent, batch gradient descent, gradient boost, meta-heuristics, and the like.

The neural network may include electronic data, which may be implemented as, for example, a software component of an application executable on the electronic device 102 or the imaging device (such as the camera 110). The neural network may rely on libraries, external scripts, or other logic/instructions for execution by a processing device, such as circuitry 202. The neural network may be implemented using hardware including a processor, a microprocessor (e.g., to perform or control performance of one or more operations), a field-programmable gate array (FPGA), or an application-specific integrated circuit (ASIC). Examples of the object detection model may include, but are not limited to, Retina Net, ResNet, Yolo, Faster R-CNN, Fast R-CNN, and Single Shot Detector.

FIG. 4 is a diagram that illustrates an exemplary scenario in which an unauthorized vehicle tailgates an authorized vehicle through an entry point, in accordance with an embodiment of the disclosure. FIG. 4 is explained in conjunction with elements from FIG. 1, FIG. 2, and FIG. 3. With reference to FIG. 4, there is shown an exemplary scenario 400. The exemplary scenario 400 includes a lock system 402, a camera 404, a first vehicle 406, a second vehicle 408, and a gate 410.

As illustrated, the first vehicle 406 may approach the gate 410 to gain access to the physical area 118. The lock system 402 associated with the access control system 104 may receive an authentication request from the first vehicle 406. In an embodiment, the authentication request may be generated based on a recognition of a license plate number on the first vehicle 406. Additionally, or alternatively, an RFID tag on the first vehicle 406 may be scanned to generate the authentication request. Upon a successful authentication, the access control system 104 may provide a grant to access the physical area 118 on other side of the gate 410. The grant may be included in an event log or a database of access grant events. Based on the grant, the gate 410 may be unlocked to allow the first vehicle 406 to enter the physical area 118.

In accordance with an embodiment, the electronic device 102 may be set up at an entrance to a parking lot from where vehicles enter and exit. Alternatively, the electronic device 102 may be located on-premise or may be a part of a cloud server infrastructure. The camera 404 may capture a video of the vehicles while the vehicles may enter the parking lot or exit from the parking lot via the gate 410. The circuitry 202 may use object detection algorithm(s) to detect a movement of the first vehicle 406 towards the parking lot in the video and may create an entry that corresponds to the defined period. The entry may contain information such as the time of detection, the location of the first vehicle 406, and other relevant details associated with the movement.

The first vehicle 406 may submit a request to unlock the gate. The circuitry 202 may authenticate the request from the first vehicle 406 to allow the first vehicle 406 to enter or exit the parking lot. After the request is authenticated, the gate 410 may open for the first vehicle 406. As illustrated, another vehicle (such as the second vehicle 408) may tailgate the first vehicle 406 to cross the gate 410 while the gate is open.

Figure 5:
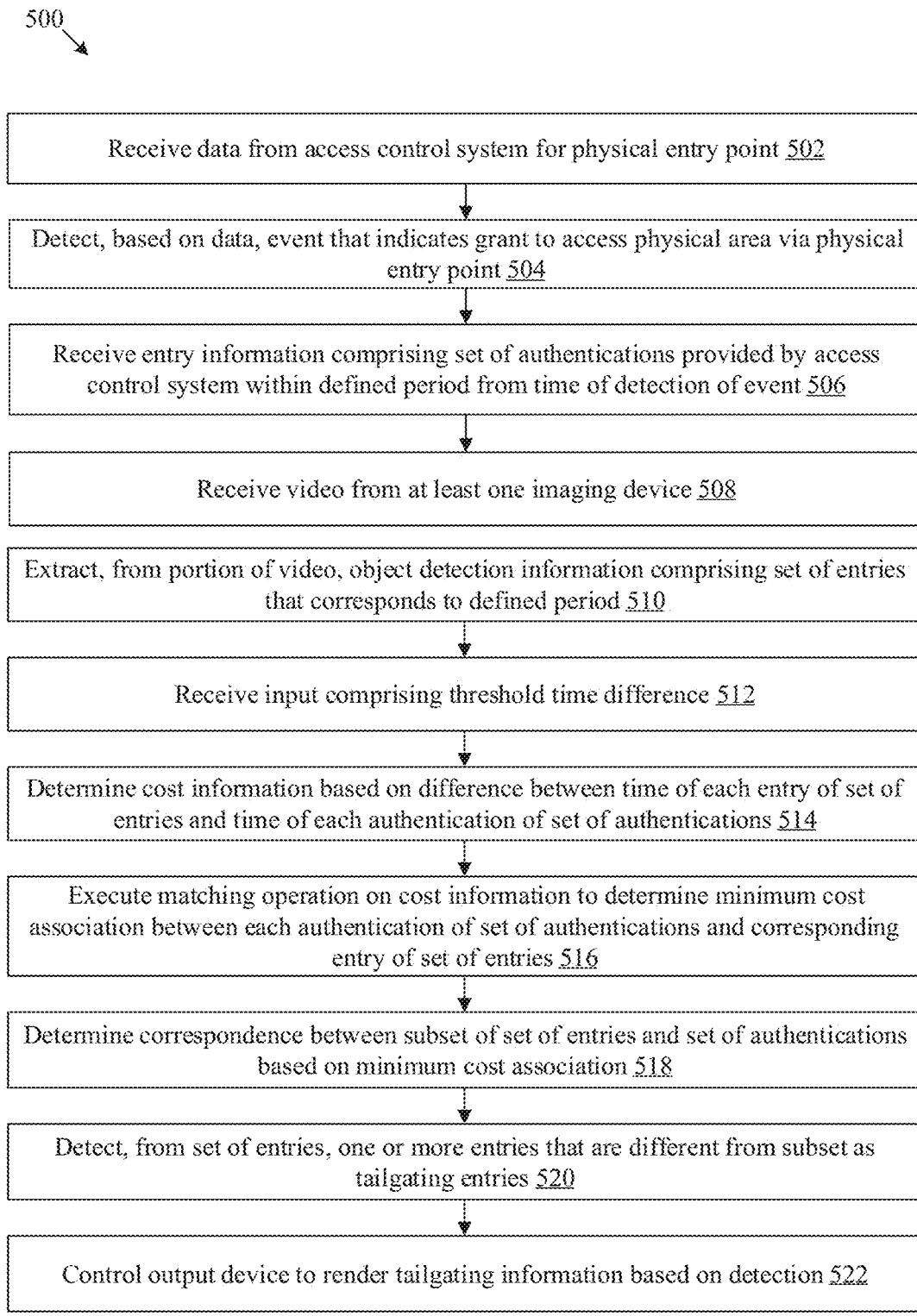
FIG. 5 is a flowchart that illustrates exemplary operations for tailgating detection using multimodal entry data, in accordance with an embodiment of the disclosure.

FIG. 5 is a flowchart that illustrates exemplary operations for tailgating detection using multimodal entry data, in accordance with an embodiment of the disclosure. FIG. 5 is explained in conjunction with elements from FIG. 1, FIG. 2, FIG. 3, and FIG. 4. With reference to FIG. 5, there is shown an exemplary flowchart 500 that provides operations from 502 to 522, as described herein. The operations from 502 to 522 may be implemented, for example, by the electronic device 102 of FIG. 1 or the circuitry 202 of FIG. 2.

At 502, data may be received from the access control system 104 for the physical entry point 116 (such as the door). The data from the access control system 104 may be received by the circuitry 202 and may correspond to information associated with the set of objects that require access to the physical area 118. In an embodiment, each of the set of objects may correspond to a vehicle in which a person is a rider of the vehicle (as illustrated in FIG. 4). In another embodiment, each of the set of objects may correspond to a person (as illustrated in FIG. 3). For example, a person may intend to access the physical area 118. The lock system 114 may require the person to authenticate to allow the person to enter or exit from the physical area 118 through the door. The authentication may correspond to one of a radio frequency-based authentication, a fingerprint-based authentication, a face-based authentication, an iris-based authentication, a voice-based authentication, a hand gesture-based authentication, a touch-based authentication, a password-based authentication, or an identifier (ID) based authentication.

At 504, an event that indicates a grant to access the physical area 118 via the physical entry point 116 may be detected. The circuitry 202 may be configured to detect the event based on the received data. The data may include information such as access control signals, door status signals, motion sensors, and other relevant signals. The physical entry point 116 may be equipped with various sensors and devices, such as a motion detector, a camera, a microphone, or other types of sensors to collect at least a portion of the data. Details associated with the detection are provided in FIG. 1 and FIG. 3, for example.

At 506, entry information provided by the access control system 104 may be received within a defined period from the time of the detection of the event. The circuitry 202 may be configured to receive the entry information from the access control system 104. The entry information may include a set of authentications, each of which may correspond to an object (such as a person) that may have accessed the physical entry point 116 within the defined period (e.g., 5 seconds). In at least one embodiment, the defined period may correspond to a time duration for which the physical entry point 116 stays open from the time of the detection of the event.

The access control system 104 may be configured to receive and process data from the lock system 114. When an object attempts to access the physical area 118 via the physical entry point 116, the lock system 114 may authenticate credentials or secret information provided by the object and may determine whether the object is authorized to access the physical area 118. Once the access control system 104 completes the authentication, it may generate the set of authentications that may be further shared with the circuitry 202.

The circuitry 202 may be configured to receive the set of authentications within the defined period from the time of detection of the event. In at least one embodiment, the circuitry 202 may log the event, a time of each entry, authentication credentials, and information related to the set of authentications.

At 508, the circuitry 202 may be configured to receive a video from at least one imaging device (such as the camera 110). The video data may be transmitted to the circuitry 202 via the communication network 122. The camera 110 may be positioned to include at least a portion of the physical entry point 116 (such as the door) in a field of view of the camera 110.

At 510, object detection information may be extracted from a portion of the video. The circuitry 202 may be configured to extract the object detection information from the portion of the video. The object detection information may include a set of entries that correspond to the defined period. For the extraction, computer vision algorithms and/or suitable machine learning models may be used to identify and track objects in the video. By way of example, and not limitation, the circuitry 202 may use a pre-trained object detector, such as YOLO (You Only Look Once), SSD (Single Shot Detector), or Faster R-CNN (Region-based Convolutional Neural Network) to identify objects in the video. The object detector may scan the video frame by frame and localize objects in all of the frames that include the object(s). The object(s) may be localized by use of bounding box predictions around respective object(s) in the video frames. For each bounding box prediction, class labels (e.g., a person label or a vehicle label) may be predicted to classify the objects in the frame. For each entry, the object detection information may include a type of object, a time of detection, a location of the object in the video frame, and the like.

At 512, an input that includes a threshold time difference may be received. In accordance with an embodiment, the circuitry 202 may receive the input via a user interface. The threshold time difference may be a pre-defined value or may be input by an administrator. The threshold time may correspond to a maximum acceptable time difference between a camera-detected entry (obtained at 510) and an authentication (obtained at 506).

At 514, cost information may be determined. In accordance with an embodiment, the circuitry 202 may be configured to determine the cost information based on a difference between a time of each entry of the set of entries and a time of each authentication of the set of authentications. As an example, if there are M entries and N authentications (i.e., access granted events), then an M×N cost matrix may be determined between the set of authentications and the set of entries. Each cell of the cost matrix may include the difference (i.e., an absolute difference) between the time of each entry of the set of entries and the time of each authentication of the set of authentications.

In accordance with an embodiment, the circuitry 202 may determine the cost information further based on a comparison of the difference with the threshold time difference. For example, if a time of an entry (i) is more than 5 seconds before a corresponding authentication (j), then a corresponding cell (Ci,j) of the cost matrix (C) may be assigned an infinity cost. Similarly, if the entry (i) is more than 15 seconds after the authentication (j), then the corresponding cell (Ci,j) of the cost matrix (C) may be assigned an infinity cost. The cost information may be used to perform a matching operation to identify all tailgating entries from the set of entries (detected from the video). Such entries may correspond to unauthorized attempts to enter or exit the physical entry point while the physical entry point 116 is open or accessible.

At 516, the circuitry 202 may be configured to execute a matching operation on the cost information to determine a minimum cost association between each authentication of the set of authentications and a corresponding entry of the set of entries. To form the minimum cost association, an entry may be paired with a corresponding authentication with a minimum time difference (i.e., a minimum cost) as compared to other time differences with other authentications in the cost matrix.

In accordance with an embodiment, the matching operation may correspond to a Hungarian matching algorithm. The Hungarian algorithm is typically used in optimization problems to find an optimal solution for assignment of items to agents based on a minimization of cost or a maximization of a profit. In other words, the Hungarian algorithm is typically used to calculate the cost of assigning each item to each agent and to find the minimum cost combination that assigns each item to exactly one agent and each agent to exactly one item. In the present disclosure, the item and the agent may correspond to the entries and the authentications, respectively. By applying the Hungarian matching algorithm to the cost information, a closest association between each authentication and a corresponding entry can be determined. This may ensure that each entry is accurately matched with the corresponding authentication and any unmatched entry in the cost matrix can be determined as an unauthorized entry (or a tailgating entry). Details related to the Hungarian matching algorithm are known to one ordinarily skilled in the art; therefore, such details are omitted from the disclosure for the sake of brevity.

At 518, a correspondence may be determined between a subset of the set of entries and the set of authentications based on the minimum cost association. In accordance with an embodiment, the circuitry 202 may determine the correspondence. For example, if five entries are detected from the video and five authentications are determined within the defined period, then the Hungarian matching algorithm may be used to determine a one-to-one correspondence between the five entries and the five authentications. In case of tailgating, the count of entries may exceed the count of authentications. Therefore, after the matching operation is completed, one or more entries (other than the subset) in the cost matrix may remain unmatched with authentication(s).

By determining the correspondence between the subset of entries and authentications, the present disclosure ensures that only authorized individuals are granted access to the physical area, and that any unauthorized access attempts are detected and recorded. The correspondence information may be used for generating reports, tracking access patterns, and improving existing security measures.

At 520, the one or more entries that may be different from the subset may be detected as one or more tailgating entries. In accordance with an embodiment, the circuitry 202 may be configured to detect the one or more entries as the tailgating entries from the set of entries. Each tailgating entry may correspond to an unauthorized access from any side (i.e., entry or exit) of the physical entry point 116. For example, if a person swipes an access card to enter a restricted area through a door and the access control system 104 authenticates the entry, then that entry may be included in the subset. If another person enters or exits from the same door without any authentication while the door is open, then that entry may be excluded from the subset and may be marked as a tailgating entry.

At 522, the output device 112 may be controlled to render tailgating information based on the one or more tailgating entries. In accordance with an embodiment, the circuitry 202 may be configured to control the output device 112 to render tailgating information based on the detection of the one or more tailgating entries. The output device 112 may be any suitable device capable of displaying or communicating information, such as a computer monitor, a mobile device, a speaker, or an alarm.

In accordance with an embodiment, the tailgating information may include a description of each tailgating entry and instructions required to respond to tailgating activities and potential security incidents that are typically associated with such activities. The tailgating information may also include, for example, a face or an image of each tailgating entry, a location of each tailgating entry, a timestamp of detection of each tailgating entry, an identifier associated with each tailgating entry, and a True Alarm Probability (TAP) score (i.e., a severity score) associated with the set of entries. The TAP score may be updated after detection of each tailgating entry to indicate a higher risk of a security incident or a data breach. In one or more embodiments, the circuitry 202 may generate an alert or notification to inform or request an authorized personnel to take appropriate actions to prevent such unauthorized access.

In accordance with an embodiment, the circuitry 202 may extract a facial image of a person associated with each entry of the set of entries. The facial image may be extracted from at least one frame of the video. The circuitry 202 may determine an identifier associated with the person based on the set of authentications. For example, if the person uses a badge to swipe a card reader device on the door, then the identifier may include an employee ID, or a code associated with the employee ID. Thereafter, the circuitry 202 may extract face information associated with the person from a database based on the identifier. For example, the face information may include an image of employee's face in the database or a description of the employee's face in the database. The one or more tailgating entries may include an entry that may be detected further based on a comparison of the facial image with the face information.

Figure 6:
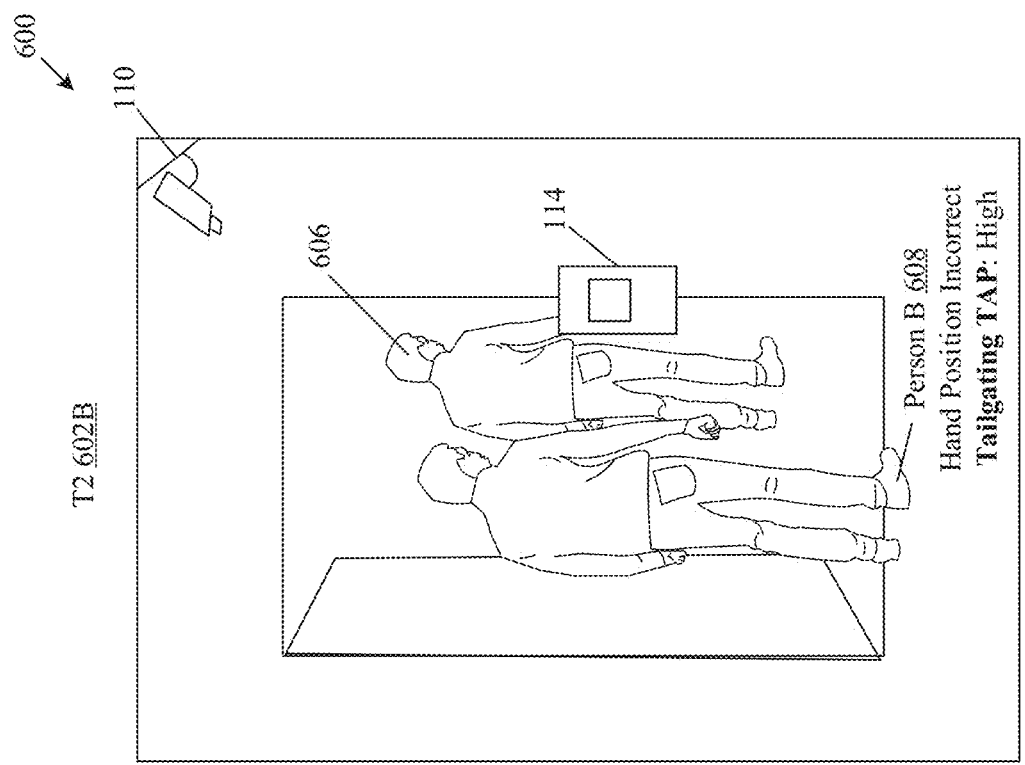
FIG. 6 is a diagram that illustrates an exemplary scenario of tailgating detection based on a position of a body portion, in accordance with an embodiment of the disclosure.
Figure 6:
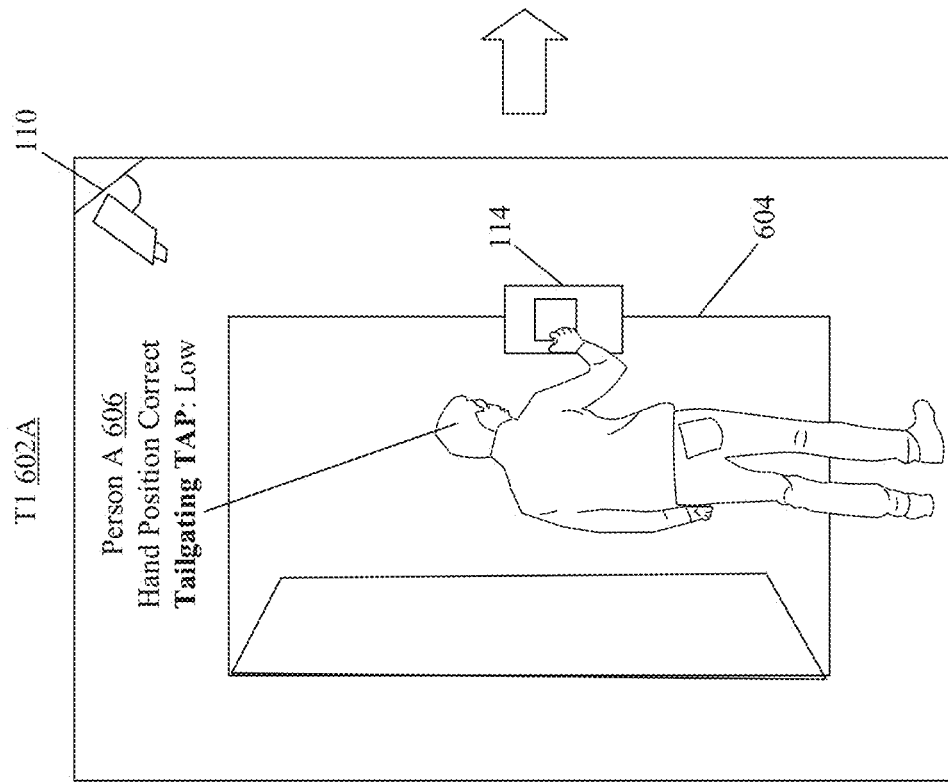

FIG. 6 is a diagram that illustrates an exemplary scenario of tailgating detection based on a position of a body portion, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In the exemplary scenario 600, there is shown a view of a door 604 at two-time instants (i.e., $T_1$ 602A and $T_2$ 602B). In the view, there is further shown a person (A) 606, a person (B) 608, and the camera 110 mounted on a ceiling of a built environment (e.g., an office space). The location of the camera 110 at both time-instants is merely an example location and such an example location should not be construed as limiting the disclosure. The present disclosure may be applicable to any other location of the camera, without a departure from scope of the disclosure.

At $T_1$ 602A, the person A 604 may provide an input to a fingerprint scanner to generate a biometric signal. The input may be indicated by a movement of the hand towards the fingerprint scanner to unlock the door 604 that controls access the physical area 118. After the person A 604 is authenticated and is given access to the physical area 118, the person B 608 may enter the physical area 118 via the door 604 without providing any input to the fingerprint scanner. The person B 608 may enter at a time $T_2$ 602B while the door 604 is open.

The circuitry 202 may be configured to detect, with respect to a location of an input interface of the lock system 114, a position of a body portion of the person associated with each entry of the set of entries (e.g., two entries corresponding to two persons A and B). The detection of the position of the body portion may be based on the video.

As shown, for example, the body portion may be one of the hands. Based on the video, a suitable object detector may be used to track a position of the hand in the video and determine whether the hand of the person A 606 or the person B 608 reached the location of the input interface in any frame of the video. While the hand of the person A 606 reached the location of the input interface, the hand of the person B 606 never reached the location of the input interface throughout the duration of the video. Therefore, the circuitry 202 may determine the entry of the person B 608 as a tailgating entry. Based on the position of the body portion (such as the hand), the circuitry 202 may further determine that TAP for entry of the person A 606 is low and TAP for entry of the person B 608 is high.

The tracking of the position of the body portion to determine a tailgating entry may supplement other methods (such as face recognition or Hungarian algorithm) in detection of tailgating entries. Multiple methods may be executed in parallel and results from all such methods may be pooled or may be filtered (based on a voting mechanism) to generate a final result that specifies all the tailgating entries for a physical entry point (such as the door 604) in a defined duration.

Figure 7:
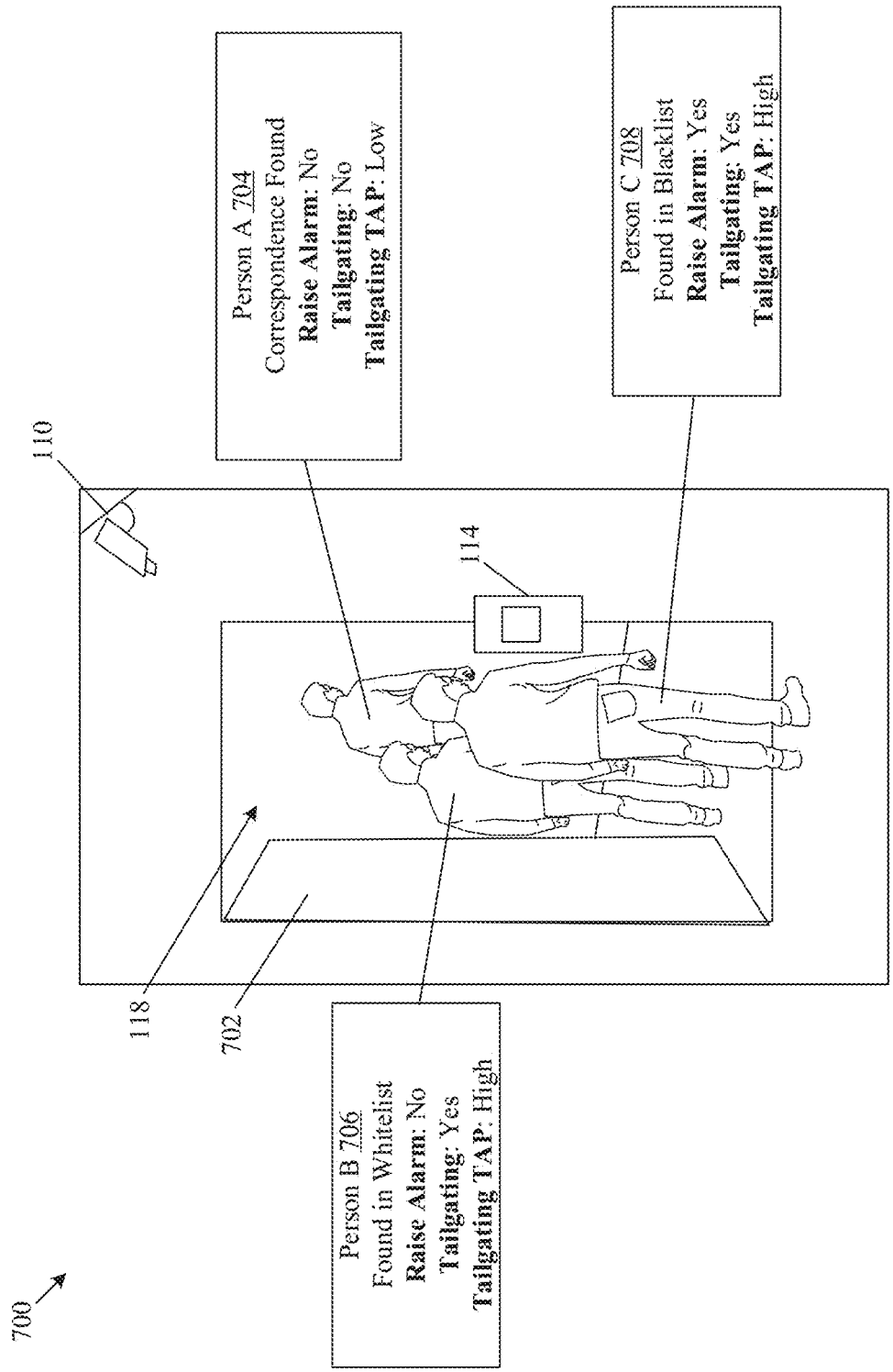
FIG. 7 is a diagram that illustrates an exemplary scenario for tailgating detection based on stored attributes of a person, in accordance with an embodiment of the disclosure.

FIG. 7 is a diagram that illustrates an exemplary scenario for tailgating detection based on stored attributes of a person, in accordance with an embodiment of the disclosure. FIG. 7 is explained in conjunction with elements from FIG. 1, FIG. 2, FIG. 3A, FIG. 3B, FIG. 4, FIG. 5, and FIG. 6. With reference to FIG. 7, there is shown an exemplary scenario 700. In the exemplary scenario 700, there is shown a door 702, a person A 704, a person B 706, a person C 708, and the camera 110. The camera 110 is shown to be mounted on a ceiling of a built environment (e.g., an office space). The location of the camera 110 is merely an example location and such an example location should not be construed as limiting the disclosure. The present disclosure may be applicable to any other location of the camera, without a departure from scope of the disclosure.

During operation, the circuitry 202 may authenticate the person A 704 and, may authorize entry of the person A 704 to the physical area 118 based on authentication. The authorization may be followed by an event in which the door 702 may be unlocked and opened to allow the person A 704 to enter the physical area 118. While the door 702 is open, the person B 706 may enter through the door 702 to access the physical area 118 without any door authentication. The circuitry 202 may be configured to extract visual attributes of the person B 706 associated with entry based on an analysis of at least one frame of the video captured by the camera 110.

The circuitry 202 may determine a whitelisted entry profile for the physical area 118 and may disregard the detected entry as a tailgating entry based on a determination that the visual attributes of the person B 706 match with attributes included in the whitelisted entry profile. For example, the whitelisted entry profile may include images or other data that represent the authorized users of the secure area, such as employees, contractors, cleaning staff, security personnel, or visitors who may have be granted access to certain sections of the physical area 118. If the visual attributes of the person B 706 match those included in the whitelisted entry profile, then the circuitry 202 may determine that the entry of the person B 706 is a safe unauthorized entry (with a history of safe behavior in the physical area). There may be no need to raise an alarm for such an entry.

In certain situations, while the door 702 is open, the person C 708 may enter the door 702 to access the physical area 118 without any door authentication. The circuitry 202 may retrieve a list of blacklisted objects associated with the physical area 118 and may determine the entry of the person C 708 as a tailgating entry based on association of the entry with at least one item in the list of blacklisted objects. Thereafter, the access control system 104 may be controlled to restrict access for the entry based on the association. For example, the access control system 104 may signal the lock system 114 to display a message informing the person C 708 that the access to the physical area 118 is an unauthorized access. If the person C 708 is detected to ignore the message, then an audio alarm may be played to alert the security personnel. The blacklisted objects associated with the physical area 118 may include, for example, a type of dress that is substantially different as compared to a type of dress that people wear in the physical area, a dress that violates a dress policy of the physical area, a missing or tampered license plate, a person with a history of tailgating or violation of security protocols, a person with a fully masked face, and the like.

By comparing attributes of each tailgating entry with the whitelisted entry profile or the list of blacklisted objects, the number of reports or notifications that may be typically received by security teams for a built environment may go down. The teams may only receive reports or notifications that require attention and action. This may help to improve efficiency of such teams and minimize delay in taking actions that may be required to maintain a high level of security and access control. Additionally, by using visual analysis techniques and comparing the results to the whitelisted entry profile, the electronic device 102 may quickly and accurately determine whether an entry is legitimate or a potential tailgating attempt, without requiring a significant intervention or a manual review from a security personnel.

Figure 8:
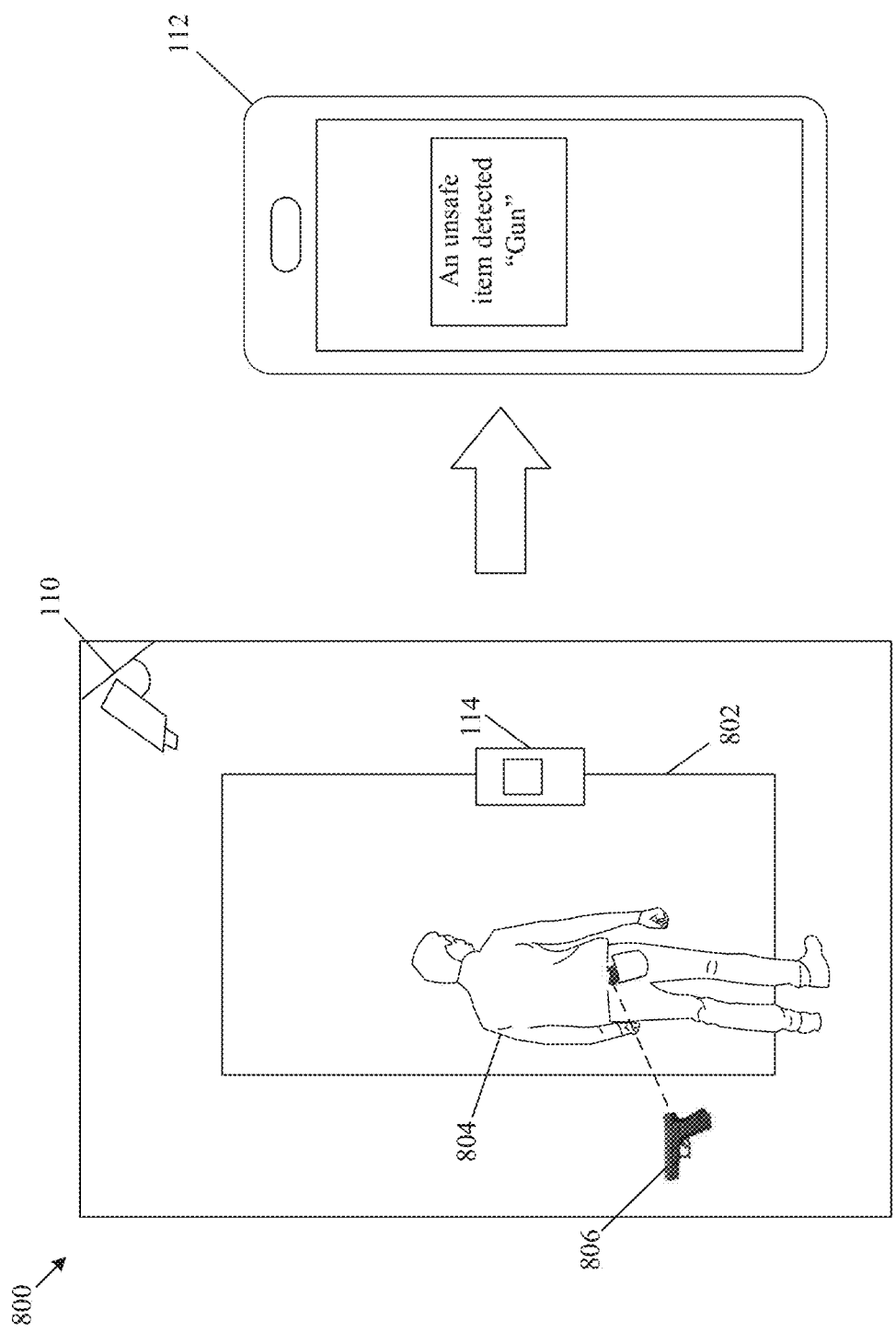
FIG. 8 is a diagram that illustrates an exemplary scenario for rendering information about one or more unsafe items that a person may carry while tailgating, in accordance with an embodiment of the disclosure.

FIG. 8 is a diagram that illustrates an exemplary scenario for rendering information about one or more unsafe items that a person may carry while tailgating, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800. In the exemplary scenario 800, there is shown a door 802, a person 804, an unsafe item 806, the camera 110, and the output device 112. The camera 110 is shown to be mounted on a ceiling of a built environment (e.g., an office space). The location of the camera 110 is merely an example location and such an example location should not be construed as limiting the disclosure. The present disclosure may be applicable to any other location of the camera, without a departure from scope of the disclosure.

As shown, for example, the person 804 attempts to tailgate another person and gains access to the physical area 118. Before the person 804 enters the physical area 118, the circuitry 202 may receive data from the access control system 104 and a video from at least one imaging device (such as the camera 110). The circuitry 202 may determine one or more unsafe items (such as the unsafe item 806) that the person 804 associated with the entry may be in possession of. The determination may be based on an analysis of at least one frame of the video. For example, an object detector that may be trained on unsafe object detection may be used to analyze the video and detect one or more unsafe items. An example of the unsafe item 806 is shown. Other examples of the unsafe item may include, but are not limited to, weapons, unauthorized electronic gadgets, hazardous materials, or other objects that may compromise the safety and security of the physical area 118. Upon determination of such unsafe items, the circuitry 202 may control the output device 112 to render information about the determined one or more unsafe items. The information may be rendered in the form of an alert or a warning message that notifies security personnel or the access control system 104 of a presence of such items.

Exemplary aspects of the disclosure may provide an electronic device for tailgating detection using multimodal entry data. The electronic device may include circuitry. The circuitry may be configured to receive data from an access control system for a physical entry point. The circuitry may be configured to detect, based on the data, an event that indicates a grant to access a physical area via the physical entry point. The circuitry may be configured to receive entry information that includes a set of authentications provided by the access control system within a defined period from a time of the detection of the event. The circuitry may be configured to receive a video from at least one imaging device and may extract, from a portion of the video, object detection information that includes a set of entries that corresponds to the defined period. The circuitry may be configured to determine cost information based on a difference between a time of each entry of the set of entries and a time of each authentication of the set of authentications. The circuitry may be configured to determine a correspondence between a subset of the set of entries and the set of authentications based on the cost information. Thereafter, the circuitry may be configured to detect, from the set of entries, one or more entries that are different from the subset as tailgating entries. An output device may be controlled to render tailgating information.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include receiving data from an access control system for a physical entry point and detecting, based on the data, an event that indicates a grant to access a physical area via the physical entry point. The operations may further include receiving entry information comprising a set of authentications provided by the access control system within a defined period from a time of the detection of the event. The operations may further include receiving a video from at least one imaging device and extracting, from a portion of the video, object detection information comprising a set of entries that corresponds to the defined period. The operations may further include determining cost information based on a difference between a time of each entry of the set of entries and a time of each authentication of the set of authentications. The operations may include determining a correspondence between a subset of the set of entries and the set of authentications based on the cost information, detecting, from the set of entries, one or more entries that are different from the subset as tailgating entries, and controlling an output device to render tailgating information based on the detection.

The present disclosure may be realized in hardware, or a combination of hardware and software. The present disclosure may be realized in a centralized fashion, in at least one computer electronic device, or in a distributed fashion, where different elements may be spread across several interconnected computer electronic devices. A computer electronic device or other apparatus adapted for carrying out the methods described herein may be suited. A combination of hardware and software may be a general-purpose computer electronic device with a computer program that, when loaded and executed, may control the computer electronic device such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer electronic device is able to carry out these methods. Computer program, in the present context, means any expression, in any language, code or notation, of a set of instructions intended to cause an electronic device with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive data from an access control system for a physical entry point;
   detect, based on the data, an event that indicates a grant to access a physical area via the physical entry point;
   receive entry information that indicates a set of authentications provided by the access control system within a defined period from a time of the detection of the event;
   receive a video from at least one imaging device;
   extract, from a portion of the video, object detection information that indicates a set of entries that corresponds to the defined period;
   determine cost information based on a difference between a time of each entry of the set of entries and a time of each authentication of the set of authentications;
   execute a matching operation on the cost information;
   determine a minimum cost association between each authentication of the set of authentications and a corresponding entry of the set of entries based on the executed matching operation;
   determine a correspondence between a subset of the set of entries and the set of authentications based on the minimum cost association;
   detect, from the set of entries, one or more entries that are different from the subset as one or more tailgating entries; and
   control an output device to render tailgating information based on the one or more tailgating entries.

2. The electronic device according to claim 1, wherein
   the physical entry point is a door or a gate, and
   the defined period corresponds to a duration for which the door or the gate stays open from the time of the detection of the event.

3. The electronic device according to claim 1, wherein each authentication of the set of authentications is one of a radio frequency-based authentication, a fingerprint-based authentication, a face-based authentication, an iris-based authentication, a voice-based authentication, a hand gesture-based authentication, a touch-based authentication, a password-based authentication, or an identifier (ID) based authentication.

4. The electronic device according to claim 1, wherein the circuitry is further configured to:
   receive an input comprising a threshold time difference; and
   determine the cost information further based on a comparison of the difference with the threshold time difference.

5. The electronic device according to claim 1, wherein
   the cost information is a cost matrix between the set of authentications and the set of entries, and
   the cost matrix includes the difference between the time of each entry of the set of entries and the time of each authentication of the set of authentications.

6. The electronic device according to claim 1, wherein the matching operation corresponds to a Hungarian matching algorithm.

7. The electronic device according to claim 1, wherein
   the set of authentications corresponds to a set of objects, and
   each object of the set of objects is a vehicle in which a person is a rider of the vehicle.

8. The electronic device according to claim 1, wherein
   the set of authentications corresponds to a set of objects, and
   each object of the set of objects is a person.

9. The electronic device according to claim 1, wherein the circuitry is further configured to:
   detect, with respect to a location of an input interface of a lock system of the physical entry point, a position of a body portion of a person associated with each entry of the set of entries,
     wherein the detection of the position of the body portion is based on the video; and
   detect at least one entry of the one or more tailgating entries based on the position of the body portion of the at least one entry.

10. The electronic device according to claim 1, wherein the circuitry is further configured to:
    extract a facial image of a person associated with each entry of the set of entries from at least one frame of the video;
    determine an identifier associated with the person based on the set of authentications;
    extract face information associated with the person from a database based on the identifier;
    compare the facial image with the face information; and detect at least one entry of the one or more tailgating entries based on the comparison of the facial image with the face information.

11. The electronic device according to claim 1, wherein the circuitry is further configured to:
retrieve a list of blacklisted objects associated with the physical area;
determine an entry of the one or more tailgating entries further based on an association of the entry with at least one item in the list of blacklisted objects; and
control the access control system to restrict an access for the entry based on the association.

12. The electronic device according to claim 1, wherein the circuitry is further configured to:
extract visual attributes of a person associated with each entry of the set of entries based on an analysis of at least one frame of the video;
determine a whitelisted entry profile for the physical area; and
disregard an entry of the person as the one or more tailgating entries based on a determination that the visual attributes of the person match attributes included in the whitelisted entry profile.

13. The electronic device according to claim 1, wherein the circuitry is further configured to:
determine, based on an analysis of at least one frame of the video, one or more unsafe items that a person associated with an entry of the one or more tailgating entries possesses; and
control the output device to render information about the determined one or more unsafe items.

14. A method, comprising:
in an electronic device:
receiving data from an access control system for a physical entry point;
detecting, based on the data, an event that indicates a grant to access a physical area via the physical entry point;
receiving entry information comprising a set of authentications provided by the access control system within a defined period from a time of the detection of the event;
receiving a video from at least one imaging device;
extracting, from a portion of the video, object detection information comprising a set of entries that corresponds to the defined period;
determining cost information based on a difference between a time of each entry of the set of entries and a time of each authentication of the set of authentications;
executing a matching operation on the cost information;
determining a minimum cost association between each authentication of the set of authentications and a corresponding entry of the set of entries based on the executed matching operation;
determining a correspondence between a subset of the set of entries and the set of authentications based on the minimum cost association;
detecting, from the set of entries, one or more entries that are different from the subset as one or more tailgating entries; and
controlling an output device to render tailgating information based on the one or more tailgating entries.

15. The method according to claim 14, wherein the matching operation corresponds to a Hungarian matching algorithm.

16. The method according to claim 14, further comprising:
detecting, with respect to a location of an input interface of a lock system of the physical entry point, a position of a body portion of a person associated with each entry of the set of entries,
wherein the detection of the position of the body portion is based on the video, and
detecting at least one entry of the one or more tailgating entries based on the position of the body portion of the at least one entry.

17. The method according to claim 14, further comprising:
extracting a facial image of a person associated with each entry of the set of entries from at least one frame of the video;
determining an identifier associated with the person based on the set of authentications;
extracting face information associated with the person from a database based on the identifier;
comparing the facial image with the face information; and
detecting at least one entry of the one or more tailgating entries based on the comparison of the facial image with the face information.

18. A non-transitory computer-readable medium having stored thereon, computer-executable instructions that, when executed by an electronic device, causes the electronic device to perform operations, the operations comprising:
receiving data from an access control system for a physical entry point;
detecting, based on the data, an event that indicates a grant to access a physical area via the physical entry point;
receiving entry information comprising a set of authentications provided by the access control system within a defined period from a time of the detection of the event;
receiving a video from at least one imaging device;
extracting, from a portion of the video, object detection information comprising a set of entries that corresponds to the defined period;
determining cost information based on a difference between a time of each entry of the set of entries and a time of each authentication of the set of authentications;
executing a matching operation on the cost information;
determining a minimum cost association between each authentication of the set of authentications and a corresponding entry of the set of entries based on the executed matching operation;
determining a correspondence between a subset of the set of entries and the set of authentications based on the minimum cost association;
detecting, from the set of entries, one or more entries that are different from the subset as one or more tailgating entries; and
controlling an output device to render tailgating information based on the one or more tailgating entries.

* * * * *